(12) United States Patent
Hayashi et al.

(10) Patent No.: US 11,413,673 B2
(45) Date of Patent: Aug. 16, 2022

(54) MANUFACTURING METHOD OF BODY FRAME AND BODY FRAME

(71) Applicant: HONDA MOTOR CO., LTD., Tokyo (JP)

(72) Inventors: Seiji Hayashi, Wako (JP); Yoshitaka Okitsu, Wako (JP); Akira Takikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 16/810,267

(22) Filed: Mar. 5, 2020

(65) Prior Publication Data
US 2020/0290104 A1    Sep. 17, 2020

(30) Foreign Application Priority Data

Mar. 15, 2019   (JP) .............................. JP2019-048588

(51) Int. Cl.
*B21D 13/02*   (2006.01)
*B21D 13/10*   (2006.01)
*B21K 7/12*    (2006.01)
*B62D 65/00*   (2006.01)
*B62D 25/04*   (2006.01)

(52) U.S. Cl.
CPC ............. *B21D 13/02* (2013.01); *B21D 13/10* (2013.01); *B21K 7/12* (2013.01); *B62D 65/00* (2013.01); *B62D 25/04* (2013.01)

(58) Field of Classification Search
CPC ................................ B21D 13/02; B21D 13/10
USPC ..................................................... 296/187.01
See application file for complete search history.

(56) References Cited

FOREIGN PATENT DOCUMENTS

| DE | 102012104734 | * 12/2013 | ............. B21D 22/02 |
|----|---|---|---|
| JP | 2004-276078 A | 10/2004 | |
| JP | 2005-119354 | 5/2005 | |
| JP | 2007-144507 A | 6/2007 | |
| JP | 2008-168707 | 7/2008 | |
| JP | 2017-131960 A | 8/2017 | |
| JP | 2018-079844 | 5/2018 | |

OTHER PUBLICATIONS

Chinese Office Action dated Sep. 1, 2021, with English translation, 12 pages.
Japanese Office Action with English translation dated Jan. 18, 2022, 9 pages.
Chinese Office Action with English Translation dated Mar. 23, 2022, 10 pages.
Japanese Office Action dated May 30, 2022, English translation included, 11 pages.

\* cited by examiner

*Primary Examiner* — Dennis H Pedder
(74) *Attorney, Agent, or Firm* — Rankin, Hill & Clark LLP (57) ABSTRACT

A manufacturing method of a body frame includes a pre-strain step of press molding a wavy shape portion in the body frame to apply pre-strain after any press molding to mold the body frame.

8 Claims, 12 Drawing Sheets

MANUFACTURING METHOD OF BODY FRAME AND BODY FRAME

INCORPORATION BY REFERENCE

The present application claims priority under 35 U.S.C. § 119 to Japanese Patent Application No. 2019-048588 filed on Mar. 15, 2019. The content of the applications is incorporated herein by reference in its entirety.

BACKGROUND OF THE INVENTION

Field of the Invention

The present invention relates to a manufacturing method of a body frame, and a body frame.

Description of the Related Art

In a case where a targeted withstand load cannot be obtained in terms of a bending force and a compression force that act on a body frame, measures to upgrade a material to a more highly strong material, to add a reinforcing material (a patch or a stiffener), and to increase a plate thickness are taken (e.g., see Japanese Patent Laid-Open No. 2008-168707 and Japanese Patent Laid-Open No. 2005-119354).

SUMMARY OF THE INVENTION

However, a measure to upgrade a material causes cost increase or the like, and measures to add a reinforcing material and to increase a plate thickness are also disadvantageous from a viewpoint of weight reduction.

To solve such problems, an object of the present invention is to easily acquire a withstand load required for a body frame without depending on measures, for example, to upgrade a material, add a reinforcing material and increase a plate thickness.

To achieve the above object, a manufacturing method of a body frame molded by press molding performed once or more times is characterized by a pre-strain step of press molding a wavy shape portion in the body frame to apply pre-strain after any press molding.

In the above configuration, the press molding includes a basic molding step of molding the body frame in a basic shape, and after the basic molding step or simultaneously with the last press molding of the basic molding step, the pre-strain step may be performed.

Furthermore, in the above configuration, the wavy shape portion may have the pre-strain adjusted in accordance with at least one of a wave height, a wave bend radius and a wave pitch.

Additionally, in the above configuration, the wavy shape portion may be provided in a region where residual strain generated by the press molding performed once or more times is relatively small.

Furthermore, in the above configuration, the wavy shape portion may be provided in at least one of a region where a ridgeline that the body frame has is avoided, a pressed surface pressed during the press molding, and a side surface bent from the pressed surface.

Additionally, in the above configuration, a wave of the wavy shape portion may extend in at least one of a longitudinal direction of the body frame and a direction orthogonal to the longitudinal direction. Furthermore, in the above configuration, the pre-strain may be within a range of plastic strain to increase yield stress of a press-molded product that forms the body frame.

Furthermore, a body frame molded by press molding is characterized in that the body frame is provided with a wavy shape portion to apply pre-strain in a range of plastic strain to increase yield stress of a press-molded product that forms the body frame, and a wave of the wavy shape portion extends in at least one of a longitudinal direction of the body frame and a direction orthogonal to the longitudinal direction.

According to aspects of the present invention, after any press molding to mold a body frame, a pre-strain step is performed that press-molds the wavy shape portion in the body frame to apply pre-strain in a range of plastic strain to increase yield stress of this body frame. Consequently, a withstand load required for the body frame is easily acquired without depending on measures, for example, to upgrade a material, add a reinforcing material and increase a plate thickness.

DETAILED DESCRIPTION OF THE PREFERRED EMBODIMENTS

Hereinafter, embodiments of the present invention will be described with reference to the drawings.

Figure 1:
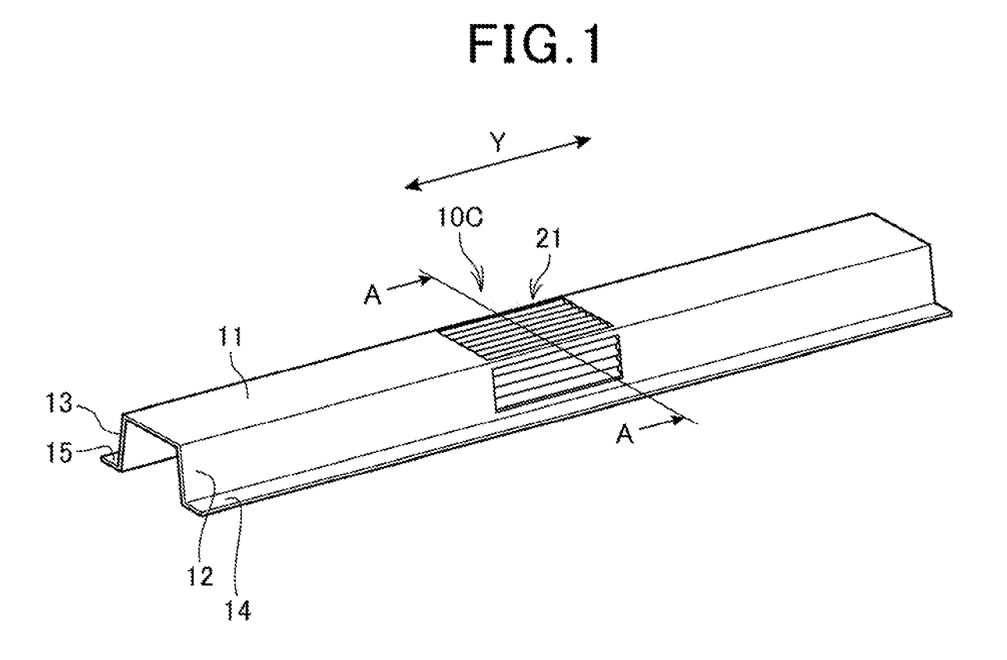
FIG. 1 is a view showing a body frame according to an embodiment of the present invention.

FIG. 1 is a view showing a body frame according to an embodiment of the present invention.

A body frame 10 is a frame part for a vehicle such as a car, and has a polygonal cross-sectional shape including a plurality of general surfaces and extending in a predetermined direction. The body frame 10 of the present embodiment is a press-molded product formed by press molding of a metal plate material (a steel sheet), and is formed in a so-called cross-sectional hat shape having three general surfaces including a plate 11 extending in a predetermined direction Y (hereinafter referred to as a longitudinal direction Y) and a pair of right and left side surfaces 12 and 13 extending downward from opposite right and left ends of the plate 11, and additionally having a pair of flanges 14 and 15 projecting outward from lower ends of the respective side surfaces 12 and 13.

The body frame 10 has a cross-sectional structure closed by joining the respective flanges 14 and 15 to a floor panel or the like, and functions as a framework part, a reinforcing part or the like of the vehicle. Note that the metal plate material for use in the body frame 10 is, for example, a highly tensile steel sheet.

Figure 2:
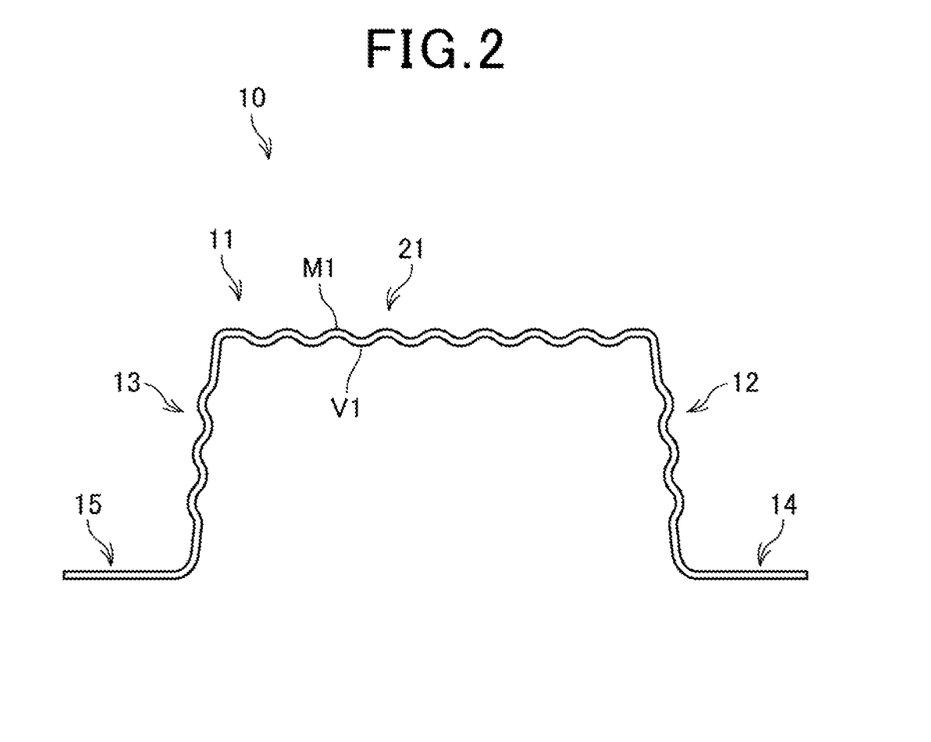
FIG. 2 is a cross-sectional view taken along the A-A line of FIG. 1.

FIG. 2 is a cross-sectional view taken along the A-A line of FIG. 1.

As shown in FIG. 1 and FIG. 2, a center 10C of the body frame 10 in the longitudinal direction Y is press-molded in a wavy shape portion 21 in which a mountain M1 and a valley V1 are repeated. FIG. 2 shows that the three general surfaces including the plate 11 and the side surfaces 12 and 13 are press-molded in the wavy shape portion 21. There are not any special restrictions on a direction in which the mountain M1 and the valley V1 extend, and FIG. 2 shows that the mountain M1 and the valley V1 linearly extend along the longitudinal direction Y and are parallel to each other.

The press molding in the wavy shape portion 21 can apply pre-strain corresponding to plastic strain. In general, as characteristics of a metal material such as the steel sheet, it is known that work hardening (also referred to as strain hardening) occurs due to the applied pre-strain and that yield stress rises. When the yield stress rises, bend strength increases, while excessively large pre-strain may lead to easy breakage in a less stretchable region due to an external force. Consequently, it is desirable to adequately manage the pre-strain.

In the body frame 10 shown in FIG. 1, since the pre-strain is applied to the center 10C, bend based on the center 10C can be effectively regulated, and the bend strength or the like of the whole body frame 10 can be efficiently increased.

Note that in FIG. 1, the center 10C of all the general surfaces 11 to 13 of the body frame 10 is press-molded in the wavy shape portion 21, but in a range where the target withstand load is obtainable, the center 10C of one of the general surfaces 11 to 13 may be only press-molded in the wavy shape portion 21. Furthermore, a region other than the center 10C may be press-molded in the wavy shape portion 21. Additionally, a shape of the body frame 10 may be suitably changed, and in short, the pre-strain may be applied to a region where bend deformation or the like is relatively easy to occur, to generate the desired withstand load.

Figure 3:
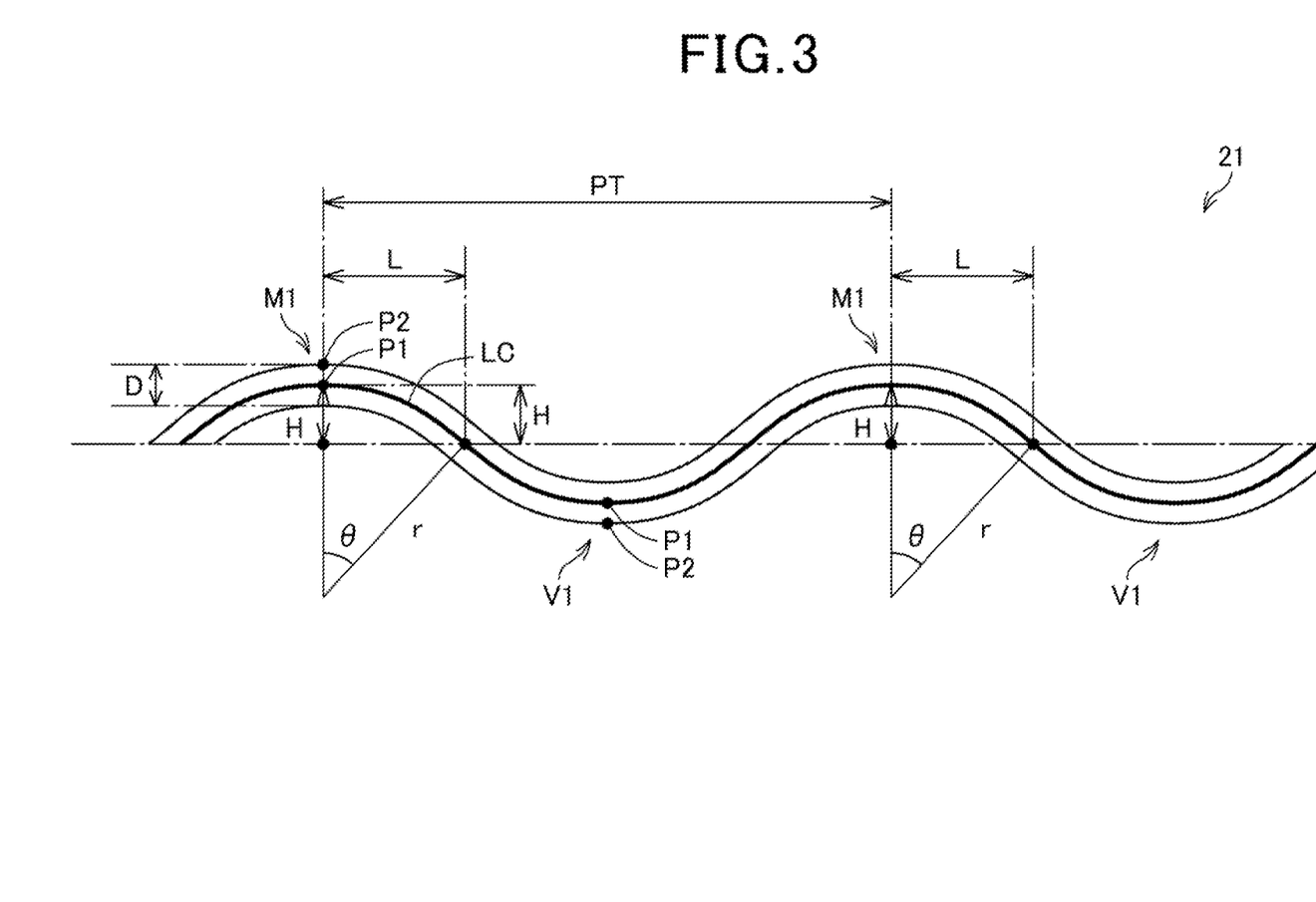
FIG. 3 is a view showing a press-molded wavy shape portion in the body frame.

FIG. 3 is a view showing the body frame 10 press-molded in the wavy shape portion 21. FIG. 3 also shows an axis LC (also referred to as a central axis LC) extending through a plate thickness center of the wavy shape portion 21.

As shown in FIG. 3, in the wavy shape portion 21, a wavy shape is adopted in which a wave including the mountain M1 and the valley V1 along an arc is repeated, and in other words, the wavy shape in which a sine wave is approximated is adopted. The pre-strain to be applied by the wavy shape portion 21 can be determined by a wave height H, a wave bend radius r (corresponding to the radius r of the arc that approximates the mountain M1 and the valley V1) or the like. Specifically, the pre-strain can be obtained by equations (1) and (2) below.

Strain amount of plate center $P1 = (r\theta/r \sin\theta) - 1$ (1)

Strain amount of plate outer portion $P2 = ((r+D/2) \times \theta/r \sin\theta) - 1$ (2)

Here, the plate center P1 corresponds to a position where a strain amount is largest on the central axis LC of the wavy shape portion 21 (a position on the central axis LC in each of an uppermost portion of the mountain M1 and a lowermost portion of the valley V1). Furthermore, the plate outer portion P2 corresponds to a position where the strain amount is largest on the surface of the wavy shape portion 21 (a position on the surface in each of the uppermost portion of the mountain M1 and the lowermost portion of the valley V1).

Additionally, the value $\theta$ corresponds to an angle of the above arc from a maximum value of the height of the wave (corresponding to the height H) to a value 0 (the angle corresponding to an angle range of a circle that approximates the mountain M1 and the valley V1). The value $r\theta$ in Equation (1) corresponds to a perimeter L shown in FIG. 3. Furthermore, a value D is a plate thickness of the body frame 10.

Also in a case where the wave height H is constant, a wave pitch PT (see FIG. 3) is changed, so that the value r and the value $\theta$ can vary. Therefore, each of values of the wave height H and the wave pitch PT is adjusted, so that the pre-strain can be easily changed and adjusted to a desired value. Note that a magnitude of the pre-strain indicates a different value in accordance with a plate thickness direction, but the pre-strain obtainable by the above equations (1) and (2) indicates maximum strain.

Figure 4:
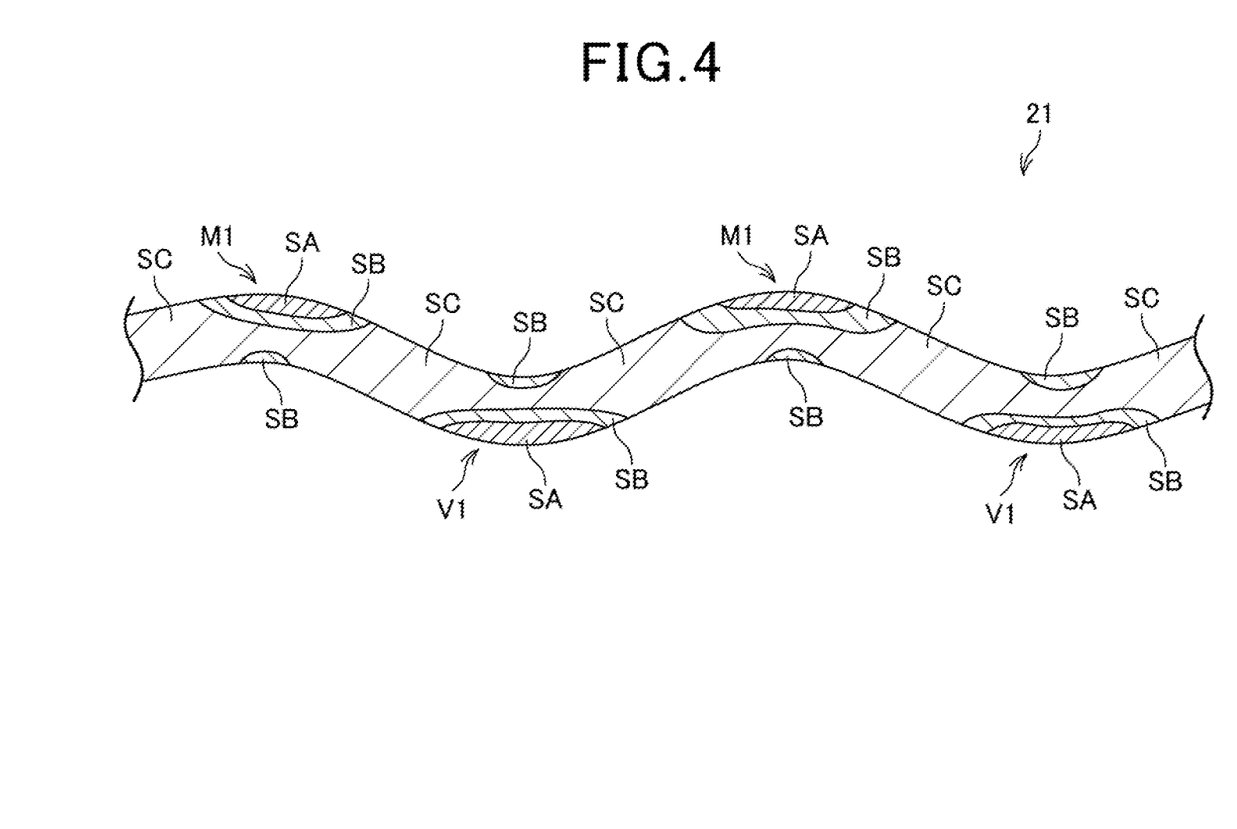
FIG. 4 is a view showing a simulation result of pre-strain applied by the wavy shape portion.

FIG. 4 is a view showing a simulation result of pre-strain applied by the wavy shape portion 21.

FIG. 4 schematically shows the plastic strain corresponding to the pre-strain in three stages for convenience of explanation, and shows a region where the strain amount is relatively large as "a region SA", a region where the strain amount is next large as "a region SB", and a region where the strain amount is relatively small as "a region SC". Note that the inventors have confirmed that the strain amounts obtained by simulation generally match the strain amounts obtained by the above simple equations (1) and (2).

Figure 5:
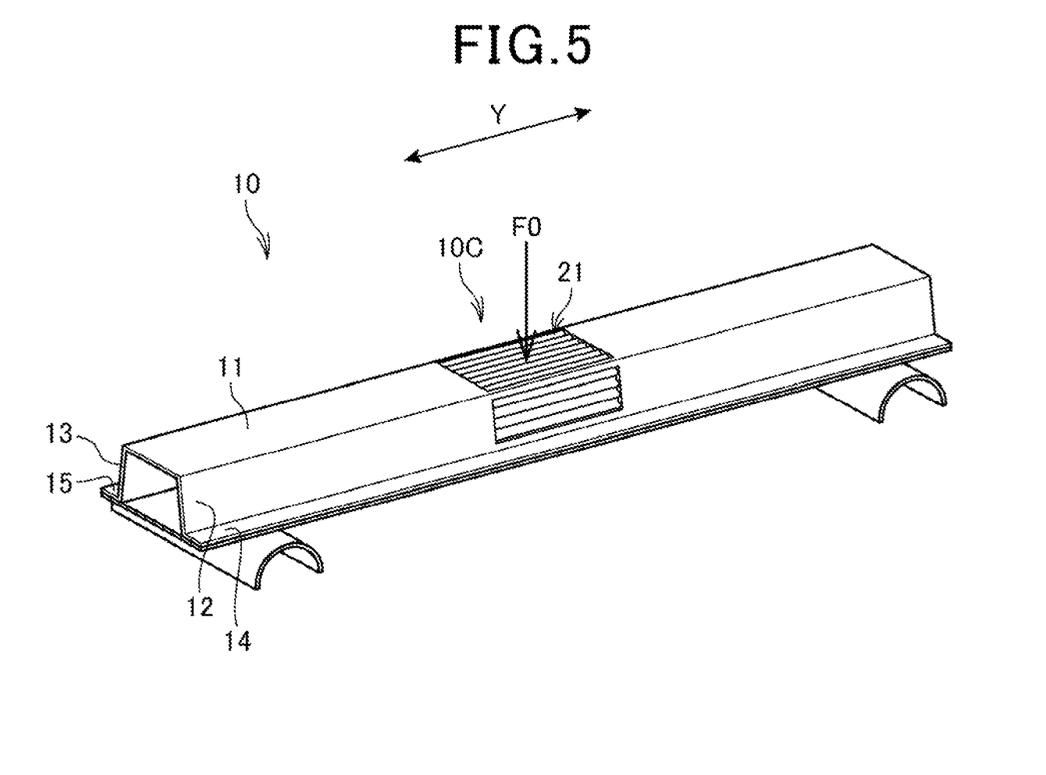
FIG. 5 is a view for use in explanation of three-point bending.
Figure 6:
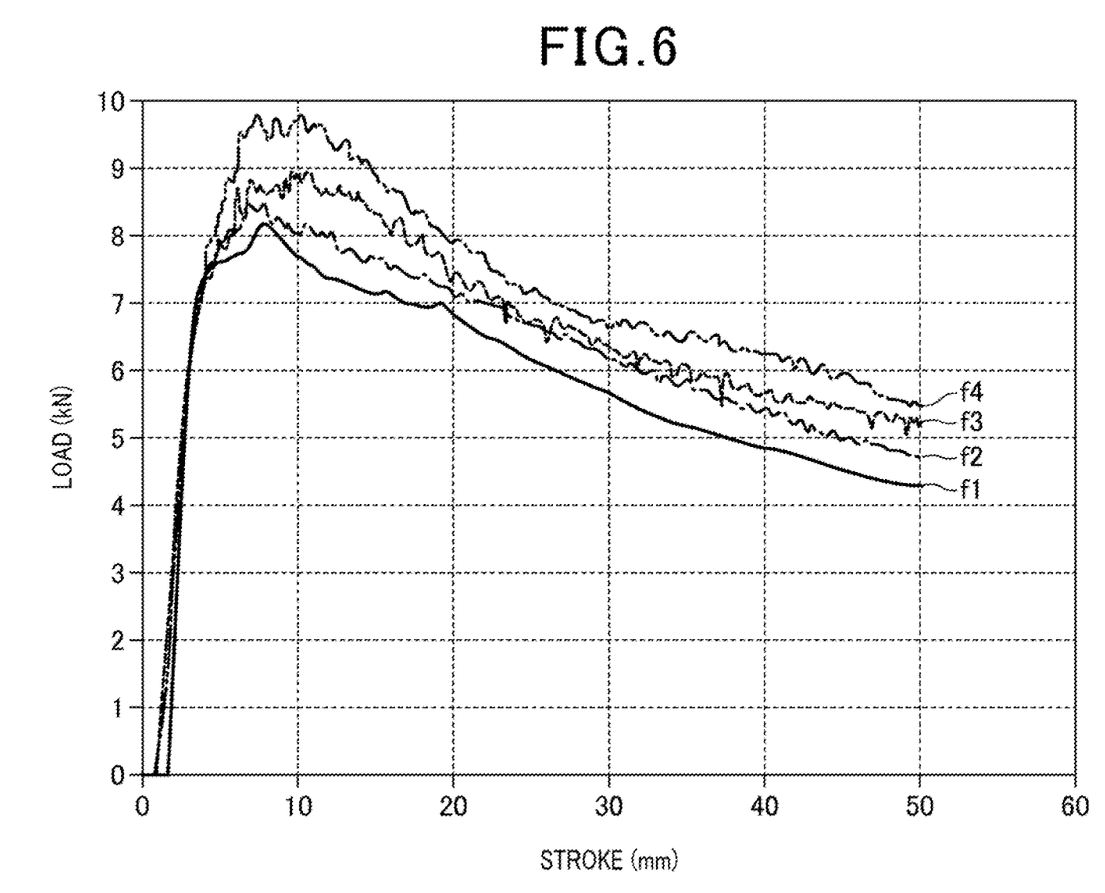
FIG. 6 is a diagram showing a verification result of the three-point bending.

The present inventors performed three-point bending of the body frame 10 provided with the wavy shape portion 21 as shown in FIG. 5, to verify effect of the pre-strain. In FIG. 5, a value FO indicates an external load (LOAD). FIG. 6 is a diagram showing a verification result (a relation between a deformation amount (STROKE) and the load (LOAD)) in a case where the body frame 10 is made of a stainless material.

In FIG. 6, a reference sign f1 indicates a characteristic curve in a case where the frame is not press-molded in the wavy shape portion 21, and a reference sign f2 indicates a characteristic curve in a case where the plate 11 corresponding to an upper surface in FIG. 5 is only press-molded in the wavy shape portion 21. A reference sign f3 indicates a characteristic curve in a case where the side surfaces 12 and 13 in FIG. 5 are only press-molded in the wavy shape portion 21, and a reference sign f4 indicates a characteristic curve in a case where the three surfaces (the plate 11 and the side surfaces 12 and 13) of the body frame 10 are press-molded in the wavy shape portion 21. It is seen from FIG. 6 that the yield stress increases in a relation of the characteristic curves f4>f3>f2>f1.

Figure 7:
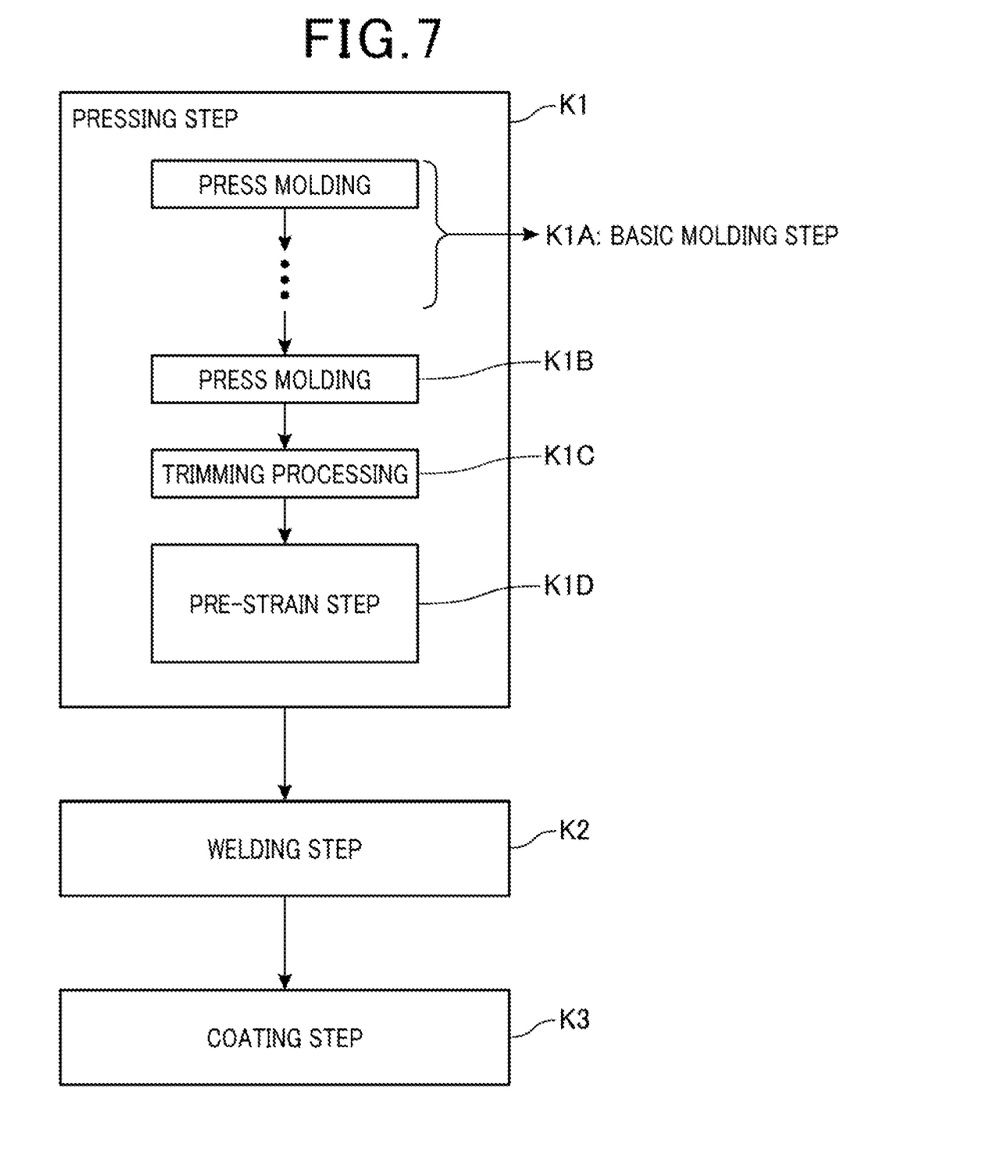
FIG. 7 is a diagram showing an example of manufacturing steps of a body using the body frame.

FIG. 7 is a diagram showing an example of manufacturing steps of a body using the body frame 10. As shown in FIG. 7, the manufacturing steps include a pressing step K1, a welding step K2, and a coating step K3, and in the pressing step K1, the body frame 10 is molded in a desired shape by a plurality of times of press moldings, and trimming processing.

In the present embodiment, in a post step of a step of press molding the body frame 10 in a basic shape (hereinafter referred to as "a basic molding step K1A"), a pre-strain step K1D of press molding the frame in the wavy shape portion 21 is performed. The basic molding step K1A corresponds to a step of forming the body frame 10 of FIG. 1 in the cross-sectional hat shape. Note that although not shown in FIG. 1, the actual body frame 10 is formed in the cross-sectional hat shape and is then suitably additionally worked, for example, to provide each portion with a stepped portion such as a recess portion or a protruding portion.

In the basic molding step K1A, the frame is formed in the basic shape by drawing, forming or the like. Therefore, if the press molding that corresponds to the pre-strain step K1D is performed prior to end of the step K1A, a region of the wavy shape portion 21 is press-molded, and desired pre-strain is hard to be obtained.

In the present embodiment, since the pre-strain step K1D is performed after the basic molding step K1A, the region of the wavy shape portion 21 is not pressed by the press molding to form the basic shape. Specifically, as shown in FIG. 7, the pre-strain step K1D is performed after press molding K1B and trimming processing K1C that are performed after the basic molding step K1A. That is, the pre-strain step K1D is finally performed in the pressing step K1. Consequently, a situation where the press molding to form the basic shape affects the wavy shape portion 21 can be avoided.

Note that timing of the pre-strain step K1D is not limited to the above timing. For example, the pre-strain step K1D is performed after at least any press molding, so that a situation where the frame is pressed in the wavy shape portion 21 to apply the pre-strain by the press molding can be avoided, and appropriate pre-strain can be applied.

In this case, the timing of the pre-strain step K1D may be changed to such an effect that the press molding or the like in the pressing step K1 does not affect the wavy shape portion 21. For example, at timing after the basic molding step K1A and before the press molding K1B or the trimming processing K1C, the pre-strain step K1D may be performed. Furthermore, during the last press molding in the basic molding step K1A or during the last press molding K1B in the pressing step K1, the press molding corresponding to the pre-strain step K1D may be simultaneously performed.

Furthermore, the body frame 10 can be molded by the press molding (corresponding to the basic molding step K1A) performed once, depending on the situation. In this case, the pre-strain step K1D may be performed after performing the press molding once. Note that each press molding described herein may be either cold press or hot press as long as the desired pre-strain can be obtained in a state of a final product (the car in the present embodiment).

In the welding step K2 shown in FIG. 7, the body frame 10 is welded to another part (e.g., a floor panel). In the next coating step K3, the part subjected to the welding step K2 is coated. For example, electrodeposition coating, intermediate coating, a baking step of heat drying paint of the intermediate coating, top coating, a baking step of heat drying paint of the top coating and the like are performed in this order. Heating conditions of at least one of these baking steps are set to satisfy conditions of annealing to the body frame 10, so that it is possible to further increase an elasticity limit, yield point, tensile strength, hardness and the like of the body frame 10.

However, the pre-strain applied in the pre-strain step K1D may decrease depending on a heat treatment of the above annealing. Consequently, it is preferable to set conditions of the heat treatment so that the pre-strain is not affected, or to apply the pre-strain in consideration of decrease due to the annealing.

The pre-strain to be applied to the body frame 10 (target plastic strain) is preset in a range of plastic strain to increase the yield stress of the press-molded product that forms the body frame 10. In this case, an upper limit value of the pre-strain is set to a half or less of a reference value for total elongation, for example, prescribed in JFS of the Japan Iron and Steel Federation Standard. Furthermore, a lower limit value of the pre-strain is set to a value obtained by extracting, from SS diagram (corresponding to a stress-strain curve) the strain amount that increases deformation stress as much as about 100 MPa from the yield stress. Additionally, as a lower limit r/D (the bend radius/the plate thickness) of the wavy shape portion 21, a crack initiation limit value obtained in advance from a bending test, so that a situation where cracking occurs in the region of the wavy shape portion 21 can be easily avoided.

Figure 8:
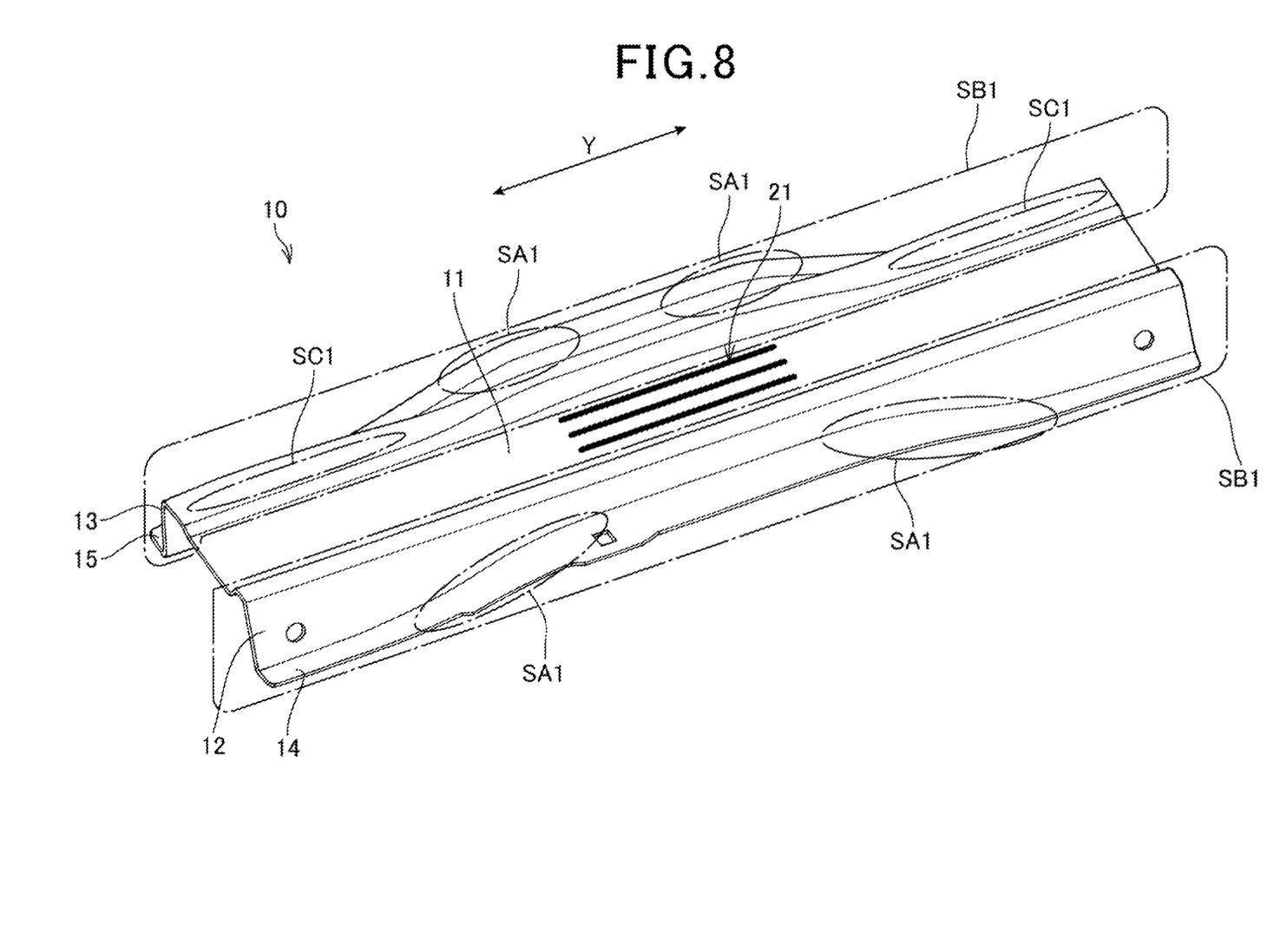
FIG. 8 is a perspective view of the body frame for use in explanation of a region of the wavy shape portion.

FIG. 8 is a perspective view showing another example of the body frame 10. Description will be made as to a region to be press-molded in a wavy shape portion 21 with reference to the body frame 10.

FIG. 8 shows a region where residual strain generated by press molding is relatively large as "a region SB1", and a region where the residual strain is especially large in the region SB1 as "a region SA1". Furthermore, in a contour showing the region SB1 in FIG. 8, a region where the residual strain is relatively small (shown as a region SC1 in FIG. 8) is present.

As shown in FIG. 8, regions shown as the regions SB1 and SA1 are a region where bend generated by press molding is present, a region where bent portions are close to each other, and the like. On the other hand, a region shown as the region SC1 in FIG. 8 and a region sandwiched among a plurality of regions SB1 is a region where the residual strain is relatively small.

The wavy shape portion 21 may be provided in a region where the residual strain generated by a pressing step K1 or the like is comparatively small. That is, the wavy shape portion 21 is provided in a region of a plate 11 in the body frame 10 in which the regions SA1 and SB1 are avoided and ridgelines that the body frame 10 has (corresponding to boundaries among a plate 11, side surfaces 12 and 13 and flanges 14 and 15) are avoided. Consequently, pre-strain is easily adjusted to a desired value (in a range of target plastic strain) by the wavy shape portion 21, and a situation where a region having excessively large plastic strain is generated can be easily inhibited.

Here, the plate 11 is a pressed surface (also referred to as a surface parallel to the pressed surface) pressed in a flat surface in the pressing step K1, and hence, it can be considered that the residual strain is almost constant in the surface. In the surface, the pre-strain is easy to adjust, and the surface is easily press-molded to form the wavy shape portion 21. Furthermore, in FIG. 8, the wavy shape portion 21 is provided at a position close to the ridgeline that the body frame 10 has, and hence, strength around the ridgelines having relatively high bend strength can increase, and the bend strength can be effectively and easily increased. Additionally, the wavy shape portion 21 is provided in the region apart from opposite ends of the body frame 10, and is therefore advantageous in increasing the bend strength and compressive strength of the body frame 10. Additionally, the wavy shape portion 21 may be provided in a region where the bend strength or the compressive strength is especially required in the body frame 10.

For example, in a case where the wavy shape portion 21 is added to the body frame 10 shown in FIG. 8, it is preferable to provide the wavy shape portion 21 in the region SC1.

The wavy shape portion 21 is not limited to the wavy shape portion shown in FIG. 3 and the like.

Figure 9:
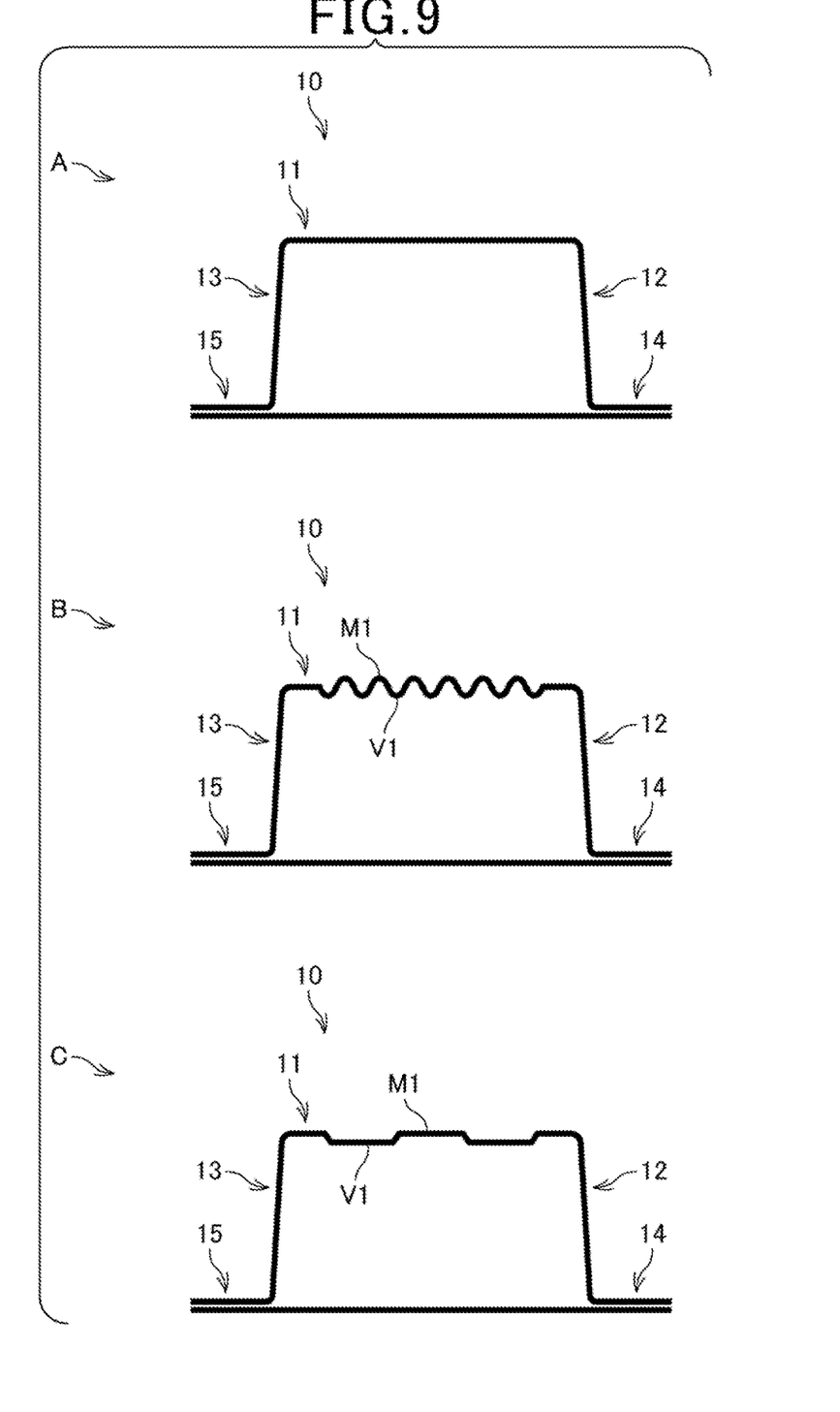
FIG. 9 is a frame cross-sectional view for use in explanation of variations of the wavy shape portion.

FIG. 9 shows frame cross-sectional views for use in explanation of variations of the wavy shape portion, a reference sign A is a frame cross-sectional view of Comparative Example 1 where a frame is not press-molded in a wavy shape portion 21, a reference sign B is a frame cross-sectional view of Reference Example 1 where a plate 11 is press-molded in the wavy shape portion 21, and a reference sign C is a frame cross-sectional view of Reference Example 2 where a plate 11 is formed in a wavy shape portion 21 (also referred to as a bead shape) including a mountain M1 and a valley V1 of a trapezoidal shape. Verification is performed as to Comparative Example 1 and Reference Examples 1 and 2 by three-point bending, and FIG. 10 shows the verification result.

Figure 10:
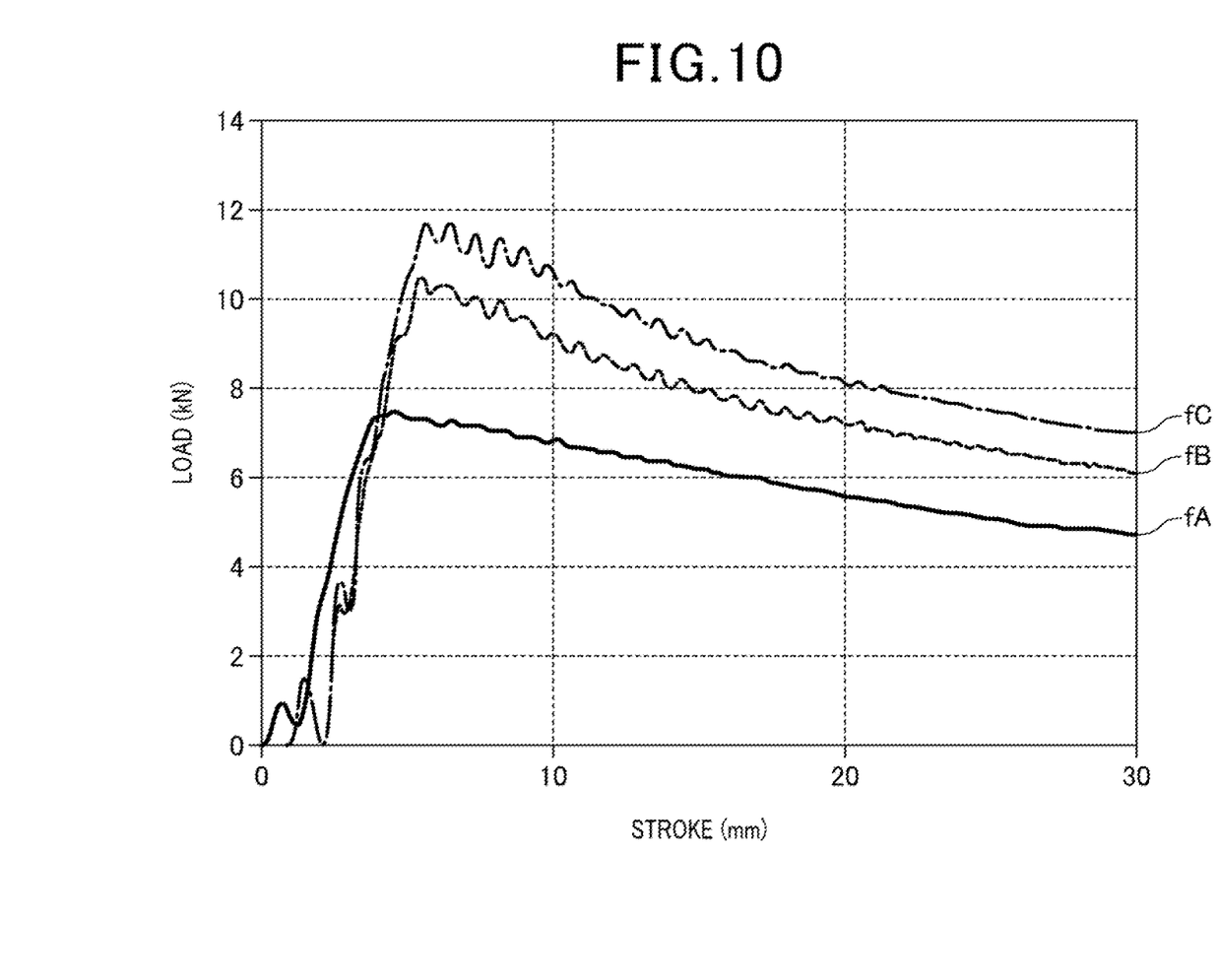
FIG. 10 is a diagram showing a verification result of three-point bending.

In FIG. 10, a reference sign fA is a characteristic curve of Comparative Example 1, a reference sign fB is a characteristic curve of Reference Example 1, and a reference sign fC is a characteristic curve of Reference Example 2.

It is clear from FIG. 10 that yield stress increases in a relation of the characteristic curves fC>fB>fA. Furthermore, each wave of the wavy shape portion 21 may be a so-called triangular wave. That is, the wavy shape portion 21 may be suitably changed in a range of the yield stress higher than that of the characteristic curve fA.

Figure 11:
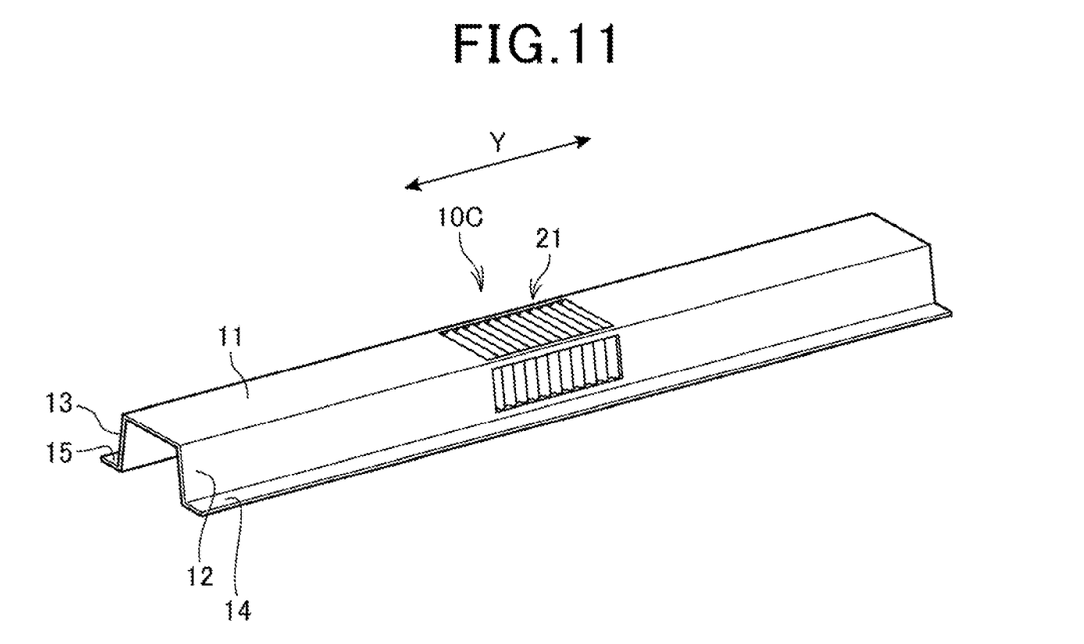
FIG. 11 is a view showing another example of a direction in which waves of the wavy shape portion extend.

In the above embodiment, it has been described that the wavy shape portion 21 is formed so that the mountain M1 and the valley V1 extend in the longitudinal direction Y of the body frame 10, but the present invention is not limited to this embodiment. For example, as shown in FIG. 11, a wavy shape portion 21 may be formed in which a mountain M1 and a valley V1 extend in a direction orthogonal to a longitudinal direction Y.

Additionally, the body frame 10 may have anisotropy of yield stress in accordance with a material for use. For example, it is known that a highly strong material generally has a high strength in a rolling direction. A direction of the wavy shape portion 21 may be set in consideration of this anisotropy. For example, the yield stress is easy to increase in the wavy shape portion 21 in which the mountain M1 and the valley V1 extend in a direction of 0° to the rolling direction. Furthermore, in the wavy shape portion 21 in which the mountain M1 and the valley V1 extend in a direction of 90° to the rolling direction, influence of the anisotropy can be decreased. Furthermore, the wavy shape portion 21 may be formed so that the mountain M1 and the valley V1 extend in a direction of 45° to the rolling direction.

As described above, in the present embodiment, the pre-strain step K1D of press molding the frame in the wavy shape portion 21 to apply the pre-strain is performed after any press molding to mold the body frame 10, so that the yield stress can be increased to increase, for example, the bend strength and the compressive strength. Therefore, a withstand load required for the body frame 10 is easily acquired without depending on measures, for example, to upgrade a material, add a reinforcing material and increase a plate thickness. Note that the pre-strain to be applied by the pre-strain step K1D may be suitably set in the range of the plastic strain to increase the yield stress of the press-molded product that forms the body frame 10.

Additionally, after the basic molding step K1A of press molding the body frame 10 in the basic shape or simultaneously with the last press molding of the basic molding step K1A, the pre-strain step K1D is performed, so that a situation where the wavy shape portion 21 is affected by the press molding to form the basic shape can be avoided.

Since the wavy shape portion 21 has the pre-strain adjusted in accordance with at least one of the wave height H, the wave bend radius r, and the wave pitch PT, the pre-strain can be easily adjusted to the desired value.

Furthermore, the wavy shape portion 21 is provided in the region where the residual strain generated by the press molding performed once or more times, so that the pre-strain can be easily adjusted to the desired value.

Additionally, the wavy shape portion 21 is provided in at least one of the region where the ridgelines that the body frame 10 has are avoided, the region of the plate 11 that is the pressed surface pressed during the press molding, and the region of the side surface 12 or 13 bent from the plate 11. Also in this case, the pre-strain can be easily adjusted to the desired value.

Furthermore, the waves of the wavy shape portion 21 extend in the longitudinal direction Y of the body frame 10, and the pre-strain is aligned along the longitudinal direction Y of the body frame 10, and is therefore advantageous in increasing the bend strength of the body frame 10. However, the direction in which the waves of the wavy shape portion 21 extend is not limited to the longitudinal direction Y and, for example, as shown in FIG. 11, the waves of the wavy shape portion 21 may extend in the direction orthogonal to the longitudinal direction Y of the body frame 10. For example, the extending direction of the waves of the wavy shape portion 21 may be adjusted in accordance with the anisotropy of the yield stress in the body frame 10.

Furthermore, the coating step K3 of coating members including the body frame 10 with the paint and heat drying the paint is performed, and the heating conditions in the coating step K3 are set to satisfy the annealing conditions to the body frame 10, so that it is possible to further increase the elasticity limit or the like of the body frame 10.

Additionally, as shown in FIG. 1 and FIG. 11, the body frame 10 of the present embodiment is formed in the wavy shape portion 21 to apply the pre-strain in the range of the plastic strain to increase the yield stress of the press-molded product that forms the body frame 10, and the waves of the wavy shape portion 21 extend in at least one of the longitudinal direction Y in the body frame 10 and the direction orthogonal to the longitudinal direction Y. The wavy shape portion 21 is set in accordance with, for example, a load that acts on the body frame 10, so that a more appropriate withstand load can be easily acquired.

The above embodiment is merely an aspect of the present invention, and can be arbitrarily modified and applied without departing from the gist of the present invention.

Figure 12:
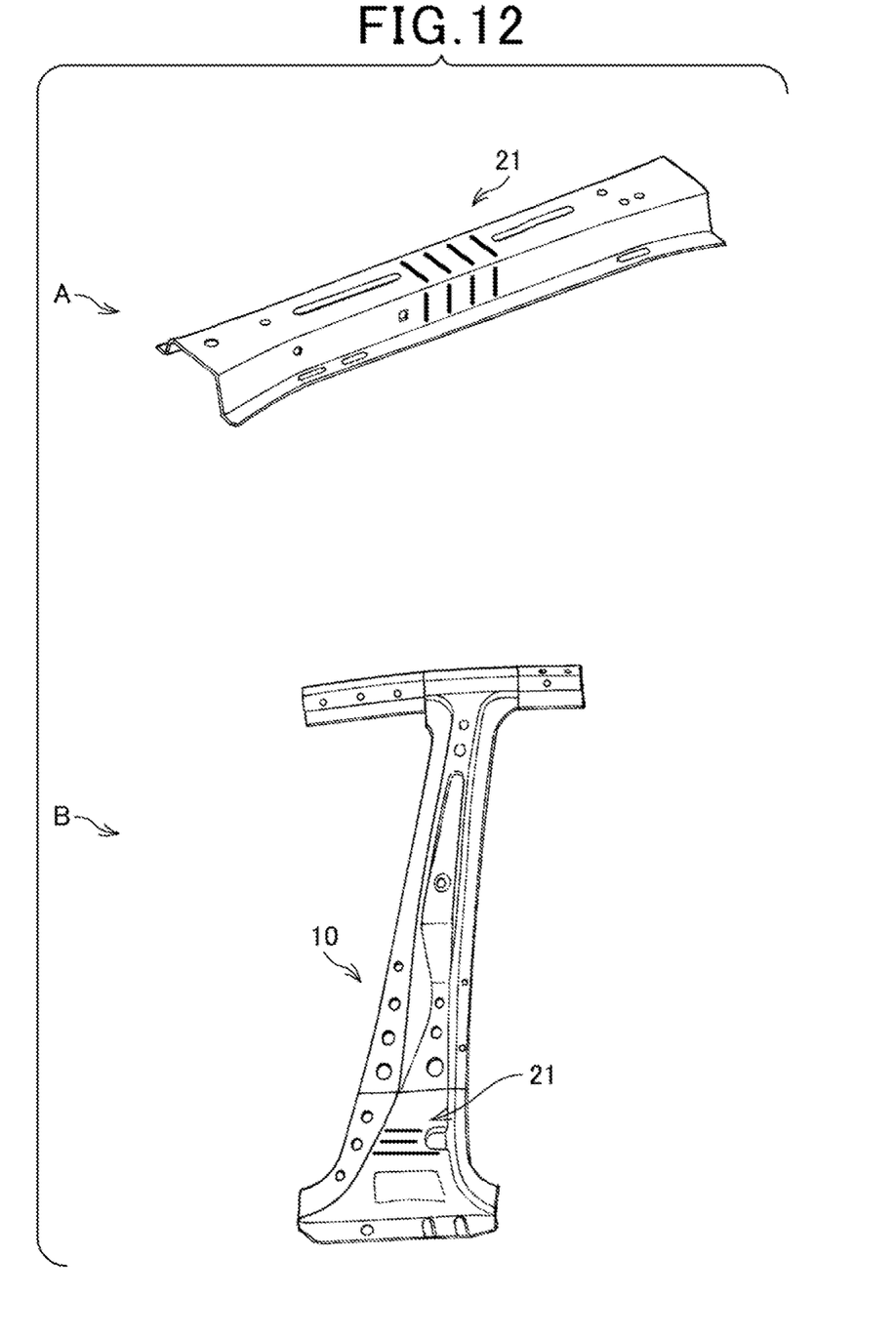
FIG. 12 is a view showing another example of the body frame.

For example, the body frame 10 may be formed in such a frame shape as shown by reference signs A and B of FIG. 12. As shown in FIG. 12, it is preferable to suitably change a position of a wavy shape portion 21 in accordance with, for example, the frame shape.

Furthermore, in the above embodiment, it has been described that the present invention is applied to, for example, the manufacturing method of the body frame 10 that the car has, but the present invention is not limited to the car, and may be applied to, for example, a manufacturing method of a body frame 10 of various known vehicles. Additionally, the present invention is not limited to the body frame 10 made of the metal, can be adopted in an arbitrary known product, and may be applied to, for example, a manufacturing method of a frame member in which strength is required. Furthermore, a material of a frame member such as the body frame 10 has strength that varies in accordance with the pre-strain, and various materials that can be press-molded are broadly applicable.

REFERENCE SIGN LIST 10 body frame
10C center
11 plate
12 and 13 side surface
14 and 15 flange
21 wavy shape portion
Y longitudinal direction of body frame
H wave height
r wave bend radius
θ angle of wave arc
D plate thickness
L perimeter
LC central axis
PT wave pitch
P1 plate center
P2 plate outer portion
M1 mountain
V1 valley
K1 pressing step
K2 welding step
K3 coating step
K1A basic molding step
K1D pre-strain step

What is claimed is:

1. A manufacturing method of a body frame molded by press molding performed once or more times, wherein
the body frame has a cross-sectional structure closed by joining a predetermined part, and the body frame is formed in a cross-sectional hat shape extending in a predetermined direction and functioning as a framework part or a reinforcing part of the vehicle, and wherein
the manufacturing method comprises a pre-strain step of press molding a wavy shape portion in the body frame to apply pre-strain satisfying a target withstand load for the body frame, at a center portion of the body frame in a longitudinal direction of the body frame and at a region apart from opposite end portions in the longitudinal direction of the body frame, after any press molding.

2. The manufacturing method of the body frame according to claim 1, wherein the press molding includes a basic molding step of molding the body frame in a basic shape, and
after the basic molding step or simultaneously with the last press molding of the basic molding step, the pre-strain step is performed.

3. The manufacturing method of the body frame according to claim 1, wherein the wavy shape portion has the pre-strain adjusted in accordance with at least one of a wave height, a wave bend radius and a wave pitch.

4. The manufacturing method of the body frame according to claim 1, wherein the wavy shape portion is provided in a region where residual strain generated by the press molding performed once or more times is relatively small.

5. The manufacturing method of the body frame according to claim 1, wherein the wavy shape portion is provided in at least one of a region where a ridgeline that the body frame has is avoided, a pressed surface pressed during the press molding, and a side surface bent from the pressed surface.

6. The manufacturing method of the body frame according to claim 1, wherein a wave of the wavy shape portion extends in at least one of a longitudinal direction of the body frame and a direction orthogonal to the longitudinal direction.

7. A manufacturing method of a body frame molded by press molding, wherein
a pre-strain step of press molding a wavy shape portion in the body frame to apply pre-strain is performed after any press molding,
the wavy shape portion is set with a bend radius based on a plate thickness of the body frame in a range of a predetermined lower limit or more,
the wavy shape portion is provided in a region where residual strain generated by the press molding performed once or more times is relatively small,
the wavy shape portion is provided in at least one of a region where a ridgeline that the body frame has is avoided, a pressed surface pressed during the press molding, and a side surface bent from the pressed surface, and
the pre-strain is within a range of plastic strain to increase yield stress of a press-molded product that forms the body frame.

8. A body frame molded by press molding, the body frame being provided with a wavy shape portion to apply pre-strain in a range of plastic strain to increase yield stress of a press-molded product that forms the body frame, wherein
the wavy shape portion is set with a bend radius based on a plate thickness of the body frame in a range of a predetermined lower limit or more,
the wavy shape portion is provided in a region where residual strain generated by the press molding performed once or more times is relatively small,
the wavy shape portion is provided in at least one of a region where a ridgeline that the body frame has is avoided, a pressed surface pressed during the press molding, and a side surface bent from the pressed surface, and
a wave of the wavy shape portion extends in at least one of a longitudinal direction of the body frame and a direction orthogonal to the longitudinal direction.

* * * * *